(12) United States Patent
English et al.

(10) Patent No.: US 6,931,211 B2  
(45) Date of Patent: Aug. 16, 2005

(54) RECONFIGURABLE DATA COMMUNICATIONS SYSTEM WITH A REMOVABLE OPTICAL BACKPLANE CONNECTOR

(75) Inventors: Daniel W. English, Salem, NH (US); Mark Galvin, Derry, NH (US)

(73) Assignee: Cedarpoint Communications, Inc., Derry, NH (US)

( * ) Notice: Subject to any disclaimer, the term of this patent is extended or adjusted under 35 U.S.C. 154(b) by 466 days.

(21) Appl. No.: 09/938,228

(22) Filed: Aug. 23, 2001

(65) Prior Publication Data

US 2003/0039014 A1 Feb. 27, 2003

(51) Int. Cl.[7] .............................................. H04B 10/10
(52) U.S. Cl. ...................... 398/164; 398/135; 398/128; 385/14; 385/90
(58) Field of Search ........................ 398/45, 122, 128, 398/135, 141, 143, 164; 385/14, 16, 90

(56) References Cited

U.S. PATENT DOCUMENTS

| | | |
|---|---|---|
| 4,673,246 A | 6/1987 | Schembri ................. 350/96.22 |
| 4,863,232 A | 9/1989 | Kwa |
| 4,971,421 A | 11/1990 | Ori ............................ 350/96.2 |
| 5,155,785 A | 10/1992 | Holland et al. ................ 385/89 |
| 5,204,929 A | 4/1993 | Machall et al. ............. 385/135 |
| 5,245,680 A | 9/1993 | Sauter |
| 5,394,503 A | 2/1995 | Dietz, Jr. et al. ........... 385/135 |
| 5,530,954 A | 6/1996 | Larson et al. ................ 385/135 |
| 5,980,312 A | 11/1999 | Chapman et al. ......... 439/540.1 |
| 6,185,021 B1 | 2/2001 | Fatehi et al. ................. 359/117 |

*Primary Examiner*—Kinfe-Michael Negash  
(74) *Attorney, Agent, or Firm*—Ropes & Gray, LLP (57) ABSTRACT

The present invention is directed to a reconfigurable data communications system. The system includes a removable optical backplane connector with a first end and a second end, a first data communications card, and a switch fabric card. The first data communications card includes an optical port configured to receive the first end of the removable optical backplane connector. The switch fabric card has a plurality of optical ports adapted to receive the second end of the removable optical backplane connector.

19 Claims, 6 Drawing Sheets

RECONFIGURABLE DATA COMMUNICATIONS SYSTEM WITH A REMOVABLE OPTICAL BACKPLANE CONNECTOR

FIELD OF THE INVENTION

The invention relates generally to data communications systems and more specifically to a data communications system with a removable optical backplane connector.

BACKGROUND OF THE INVENTION

Traditionally, data communications systems that provide switching of voice and data packets include either a hard-wired electrical backplane or a hardwired optical backplane. Hardwired backplanes limit the reconfigurability of the systems by restricting the location of communications cards and switch fabric cards to the same equipment chassis. Additionally, as the system becomes more complex and the amount of network traffic increases, the capacity of the backplane typically cannot be increased. If the full capacity of the backplane is reached and network traffic continues to increase, a new system is needed to accommodate all network traffic. In other words, the backplane of the system can limit the useful life of the system.

If a communications channel (i.e., an optical fiber) in the hardwired backplane that connects a communications card and a switch fabric card becomes inoperative, it is typically very difficult to implement the necessary repairs. Typically, data packets transferred between the communications card and the switch fabric card are routed through a back-up channel in the hardwired backplane. If all back-up channels are in use, however, communication between the communications card and the switch fabric card is not possible. What is needed is a reconfigurable data communications system that addresses these issues.

SUMMARY OF THE INVENTION

The present invention provides a reconfigurable communications system with a removable optical backplane connector that allows for expansion of the communications system as network traffic increases. Additionally, the removable optical backplane connector provides for increased reconfigurability by providing an optical patch-panel approach to connecting communications cards with a switch fabric card. Thus, communications cards and switch fabric cards can reside in different places (e.g., different equipment chassis) and maintain full functionality. Moreover, the removable optical backplane connector is easily replaced if the connector becomes inoperative.

One aspect of the present invention is directed to a reconfigurable data communications system including a removable optical backplane connector, a first data communications card, and a switch fabric card. The removable optical backplane connector has a first end and a second end. The first data communications card includes an optical port adapted to receive the first end of the removable optical backplane connector. The switch fabric card has a plurality of optical ports adapted to receive the second end of the removable optical backplane connector. In one embodiment, the first data communications card includes a plurality of input ports adapted to receive input signals and provides the input signal at the optical port. In further embodiments, the input signals are optical and/or electrical signals.

In one embodiment, the removable optical backplane connector is an optical fiber. In another embodiment, the removable optical backplane connector includes a transmit optical fiber and a receive optical fiber. In other embodiments, the optical ports of the first data communications card and switch fabric card are optical transceivers. In one embodiment, the first data communications card is disposed in one chassis and the switch fabric card is disposed in a second chassis. In yet another embodiment, the first data communications card includes a removable optical transceiver card. In a further embodiment, the first data communications card includes a line card in electrical communication with the removable optical transceiver card.

In another aspect, the reconfigurable data communications system includes a removable optical backplane connector, a removable optical transceiver card, a data communications card and a switch fabric card. The removable optical backplane connector includes a first end and a second end. The removable optical transceiver cards has a first optical port adapted to receive the first end of the removable optical backplane connector. The data communications card is in electrical communication with the removable optical transceiver card. The switch fabric card has a plurality of optical ports adapted to receive the second end of the removable optical backplane connector. In one embodiment, the data communications card and the removable optical transceiver card are disposed within a first chassis, and the switch fabric card is disposed within a second chassis. In another embodiment, the data communications card, the removable optical transceiver card, and the switch fabric card are disposed within the same chassis.

In still another aspect, the invention includes a plurality of removable optical backplane connectors, a first data communications card, a second data communications card, and a switch fabric card. Each removable optical backplane connector includes a first end and a second end. The first data communications card includes a line card and a removable optical transceiver card. The line card is in electrical communication with the removable transceiver card. The removable optical transceiver card has an optical port adapted to receive the first end of a first one of the plurality of removable optical backplane connectors. The second data communications card includes a line card and a removable optical transceiver card. The line card is in electrical communication with the removable transceiver card. The removable optical transceiver card has an optical port adapted to receive the first end of a second one of the plurality of removable optical backplane connectors. The switch fabric card has a plurality of optical ports. A first one of the optical ports receives the second end of the first one of the plurality of removable optical backplane connectors, and a second one of the optical ports receives the second end of the second one of the removable optical backplane connectors.

BRIEF DESCRIPTION OF THE DRAWINGS

The invention is pointed out with particularity in the appended claims. The advantages of the invention may be better understood by referring to the following description taken in conjunction with the accompanying drawing in which:

DETAILED DESCRIPTION OF THE INVENTION

Figure 1:
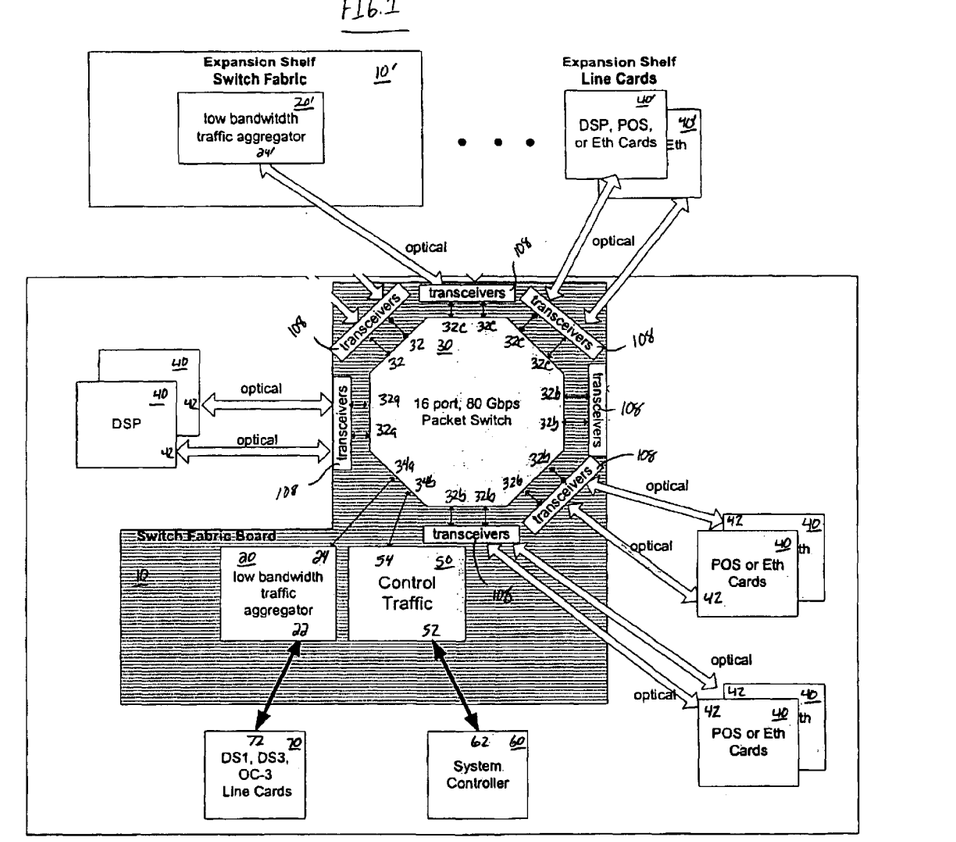
FIG. 1 is a block diagram depicting an embodiment of a reconfigurable data communications system of the present invention.
Figure 2:
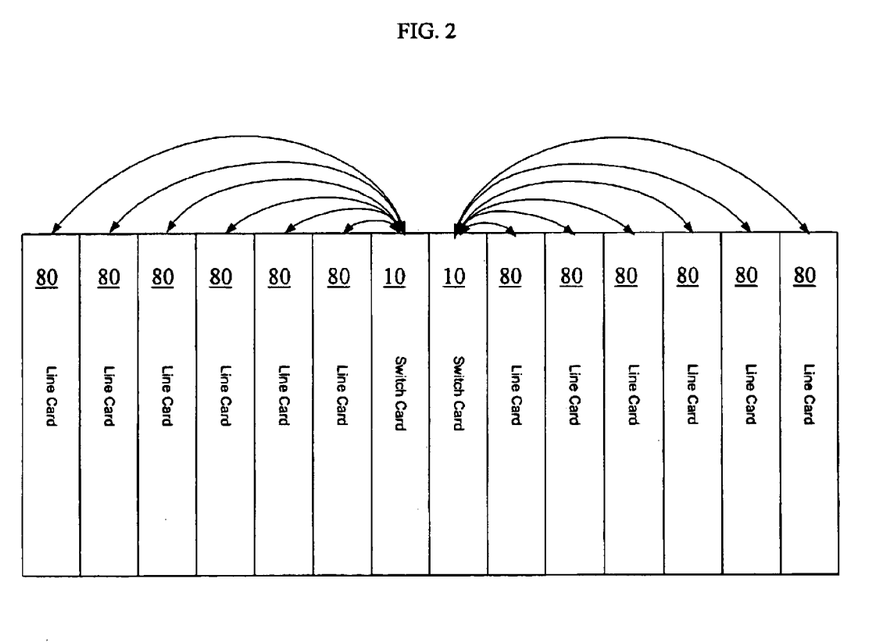
FIG. 2 is a block diagram depicting a single shelf embodiment of a reconfigurable data communications system constructed in accordance with the present invention.
Figure 3:
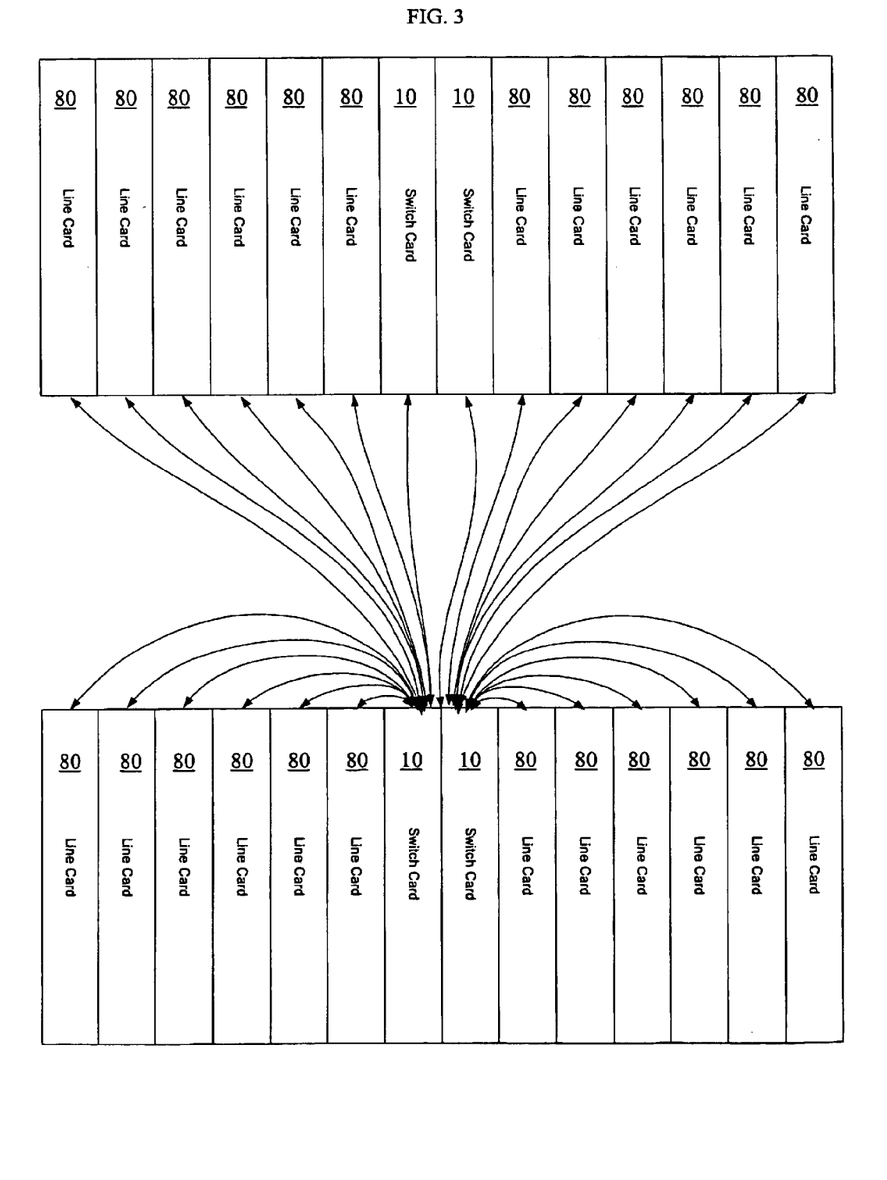
FIG. 3 is a block diagram of a multi-shelf embodiment of a reconfigurable data communications system constructed in accordance with the present invention.

With reference to FIG. 1, in brief overview, a reconfigurable data communications system according to the present invention includes a switch fabric card 10, a plurality of optical communications cards 40 in optical communication with switch fabric card 10, and a system controller 60 in communication with switch fabric card 10. Optical communications cards 40 communicate with switch fabric card 10 at rates of approximately 2.5 gigabits per second (Gbps) to 10 Gbps. Switch fabric card 10 includes a low bandwidth traffic aggregator 20 having input/output ports 22 and 24, a control traffic module 50 having input/output ports 52 and 54, a plurality of optical transceivers 108, and a packet switch 30 having a plurality of input/output ports 32a, 32b, and 32c (referred to generally as 32) and input/output ports 34a and 34b (referred to generally as 34). Packet switch 30 provides high speed packet switching (e.g., at rates as great as 320 Gbps or more). Packet switch 30 is in communication with the plurality of optical transceivers 108 and communicates with them through input/output ports 32. Packet switch 30 is also in electrical communication with the control traffic module 50 through input/output ports 34b and 54, respectively. Packet switch 30 is in communication with the low bandwidth traffic aggregator 20 through input/output ports 34a and 24. The low bandwidth traffic aggregator 20 is configured to receive communications signals in a variety of communications formats from, for example, Digital Service Level 1 (DS1), Digital Service Level 3 (DS3), and Optical Carrier Level 3 (OC-3) cards, generally referred to as low bandwidth cards 70 (only one shown). Packet switch 30 communicates with the plurality of optical communications cards 40 through optical transceivers 108 and input/output ports 32a and 42, respectively. Optical communications cards 40 accommodate a variety of communications formats, for example, packet over SONET (POS), Ethernet, and various Digital Signal Processing (DSP) functions. In one embodiment, switch fabric card 10, optical communications cards 40, and low bandwidth cards 70 (referred to generally as line cards 80), and system controller 60 are integrated into a single equipment rack, as depicted in FIG. 2. In other embodiments, additional line cards 80' and switch fabric cards 10' are integrated into two or more equipment racks as depicted in FIG. 1 and FIG. 3.

In operation, optical communications cards 40 and low bandwidth cards 70 provide data packets to switch fabric card 10. In response, switch fabric card 10 directs each data packet to its appropriate destination. Generally, low bandwidth cards 70 manage low bandwidth network traffic (i.e., speeds less than 1 Gbps) and communicate directly with low bandwidth traffic aggregator 20 through input/output ports 72 and 22, respectively. Low bandwidth traffic aggregator 20 receives data packets from low bandwidth cards 70 and bundles the low bandwidth traffic together to thereby use a greater portion of the bandwidth allocated to input/output port 34a of packet switch 30. Optical communications cards 40 generally manage high bandwidth network traffic (speeds greater than 1 Gbps). Packet switch 30 receives data packets from optical communications cards 40, and directs the data packets to their appropriate destinations.

System software running on system controller 60 determines which one of the switch fabric cards 10 is fully active. If the active switch fabric card 10 malfunctions or otherwise becomes inoperative, system controller 60 directs the other switch fabric card 10 to become active and manage the network traffic. Thus, redundancy is built into the system and a higher availability of data communications services is maintained. Control traffic module 50 receives commands from system controller 60 and also manages traffic internal to switch fabric card 10 (e.g., routing tables and protection switching).

Figure 4:
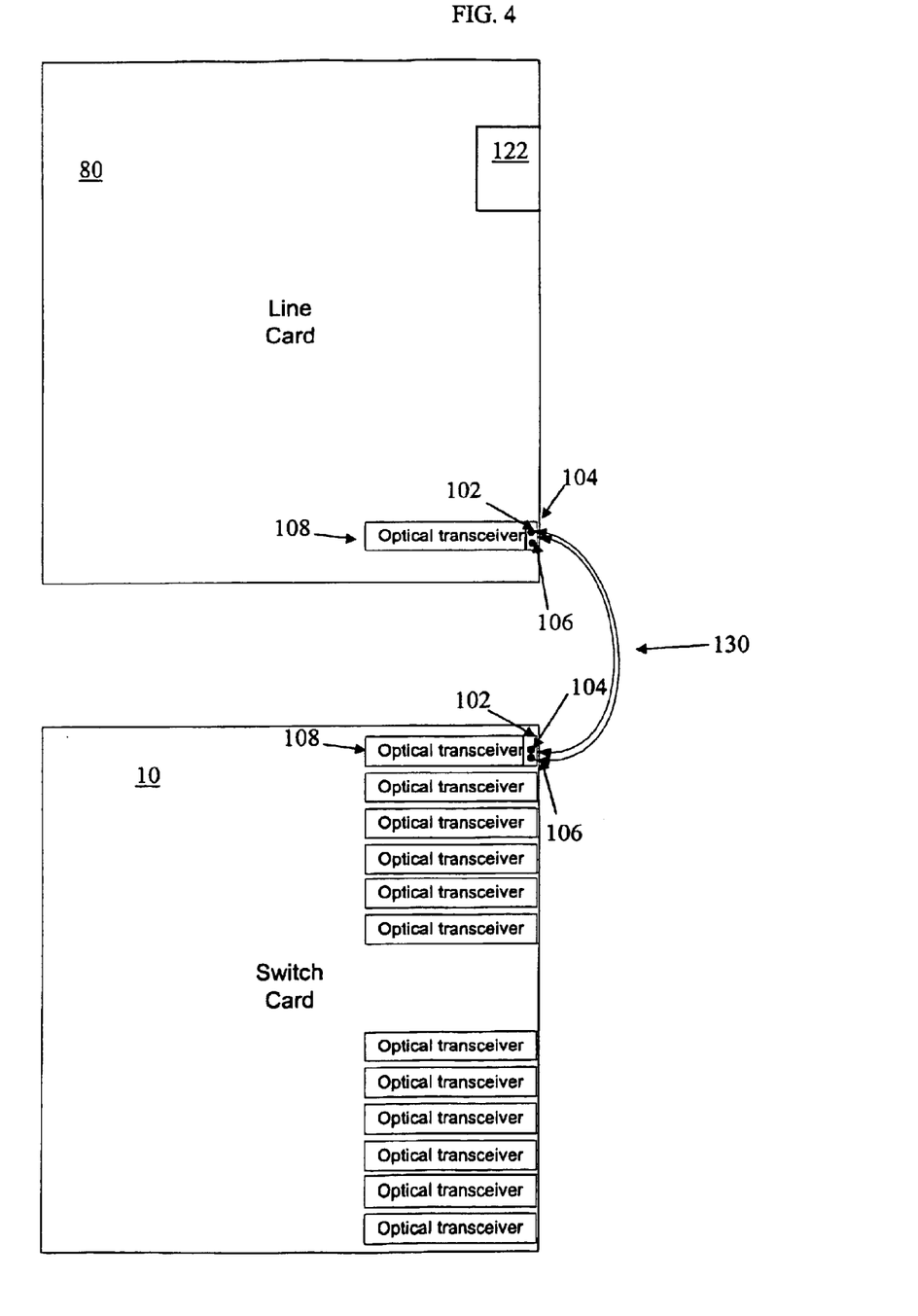
FIG. 4 is an illustration of an embodiment of a switch fabric card and a line card constructed in accordance with the present invention.

One embodiment of a line card 80 and a switch fabric card 10 constructed in accordance with the present invention is shown in FIG. 4. Line card 80 and switch fabric card 10 each include at least one optical transceiver 108. Additionally, line card 80 can include one or more input/output ports 122 adapted to receive data packet from remote network entities (i.e., routers, switches, SONET multiplexers, and other transmission or networking equipment). Input/output ports 122 can be, for example, a coaxial connector, a T1 connector or an RJ 45 connector. Each optical transceiver 108 includes an optical connector port 102 having a transmit interface 104 and receive interface 106.

In operation, line cards 80 receive signal representing the data packets from remote network entities through input/output port 122. Line cards 80 forward the data packets on to switch fabric card 10 through removable optical backplane connector 130. Once received, switch fabric card 10 determines the appropriate destination of the data packets and forwards them to their appropriate destination.

Figure 5:
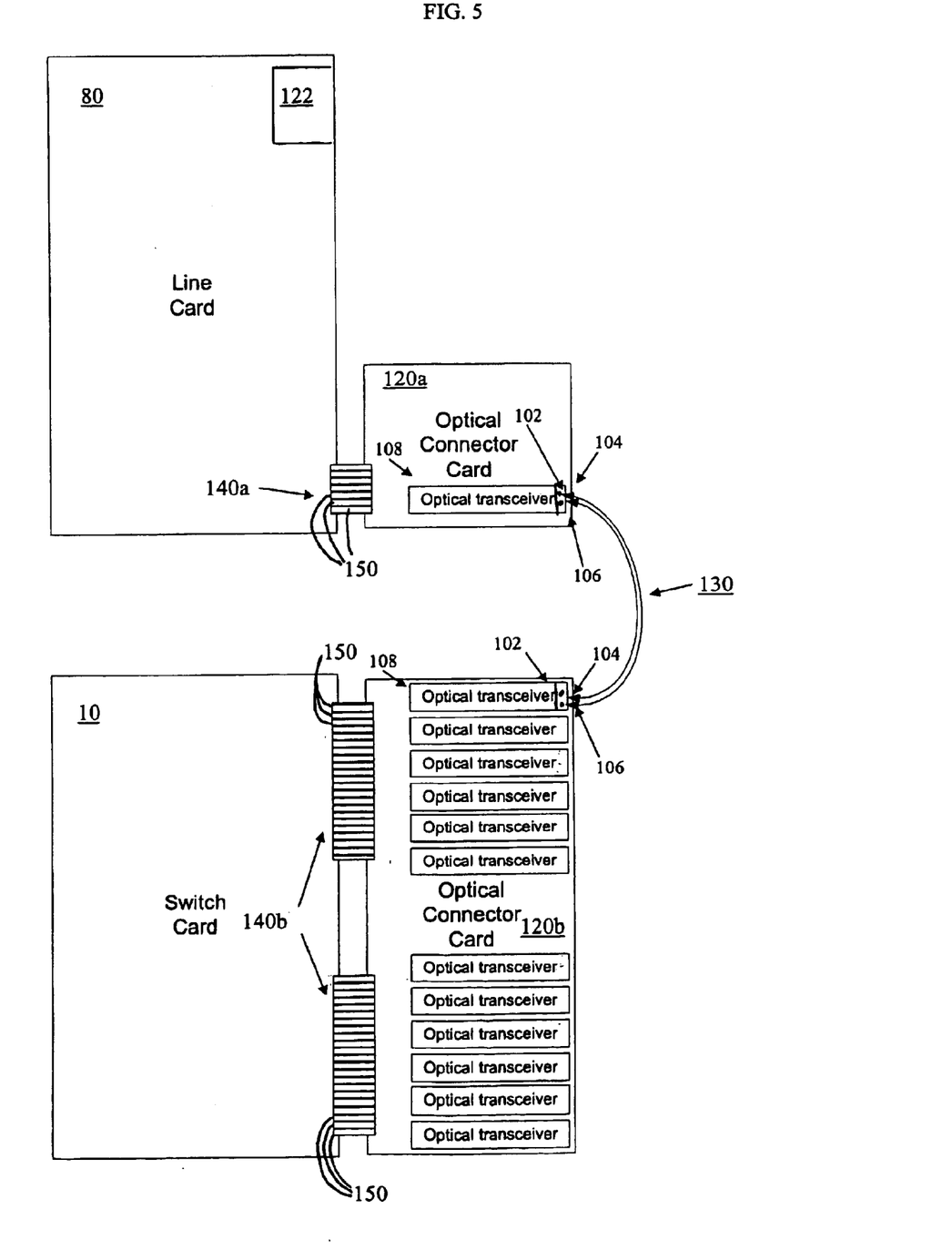
FIG. 5 is an illustration of another embodiment of a switch fabric card and a line card constructed in accordance with the present invention.

In another embodiment illustrated in FIG. 5, line card 80 and switch fabric card 10 include a midplane 140a and 140b, respectively, and an optical connector card 120a and 120b respectively, (referred to generally as 120). Midplanes 140 facilitate communication between line card 80 and optical connector card 120a as well as switch fabric card 10 and optical connector card 120b through a plurality of electrical connectors 150. Optical connector cards 120 include at least one optical transceiver 108. Provided a redundant switch fabric card 10 is installed, replacement of switch fabric card 10 is possible without disrupting the system configuration because the optical connector card 120b does not have to be replaced, therefore, the system configuration is unchanged. Additionally, provided a redundant line card 80 is installed replacement of a line card 80 with a different type of line card 80 does not require reconfiguration of other system components (e.g., optical connector card 120a).

In operation, optical or electrical signals representing the data packets are received from remote network entities through input/output port 122. In response, the signals are provided to optical transceiver 108 through midplane 140. Optical connector card 120a communicates the data packets to optical connector card 120b through a removable optical backplane connector 130. Optical transceiver 108 transforms the optical signals into electrical signals and provides them to switch fabric card 10 through the electrical connectors 150 of midplane 140. Switch fabric card 10 determines the appropriate destination of the data packets and forwards them to their respective destinations.

Figure 6:
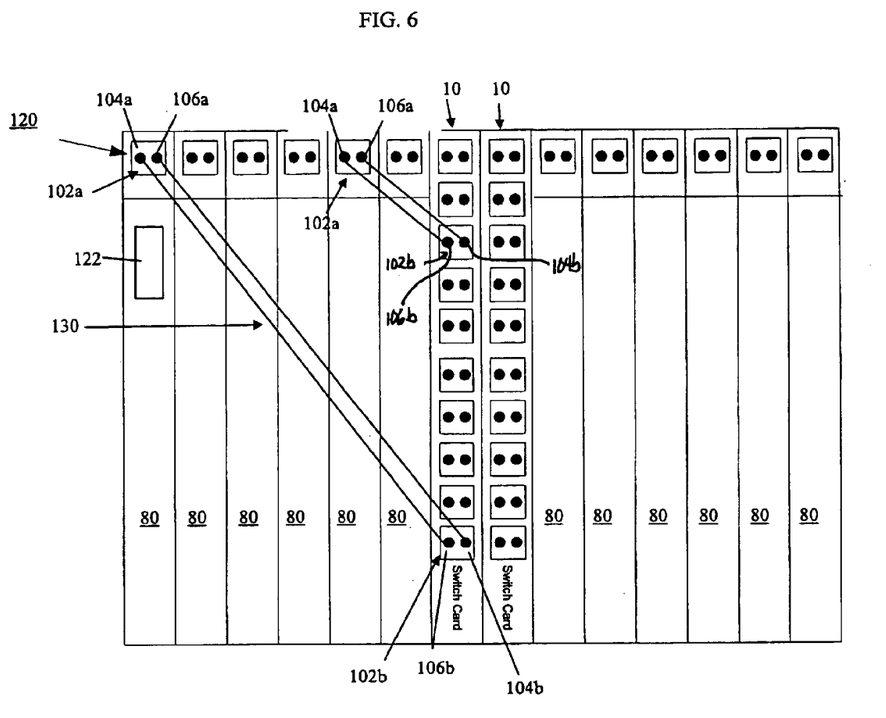
FIG. 6 is a rear view illustration of an embodiment of a reconfigurable data communications system of the present invention.

With reference to FIG. 6, a rear view of the typical reconfigurable data communications system constructed in accordance with the present invention includes a plurality of line cards 80, optical connector cards 120, and two switch fabric cards 10. Optical connector port 102*a* is configured to receive a first end of the removable optical backplane connector 130. Optical connector port 102*b* is configured to receive a second end of the removable optical backplane connector 130. In one embodiment, the removable optical backplane connector 130 is a single optical fiber having a transmit and receive channel. In another embodiment, the removable optical backplane connector 130 is an optical cable having a transmit optical fiber and a receive optical fiber.

In operation, line cards 80 receive data packets from remote network entities through connection ports 122. Line cards 80 provide the received data packets to transmit interface 104*a* of optical connector port 102*a* of optical connector card 120. Switch fabric card 10 receives the data packets through the removable optical backplane connector 130 at a respective receive interface 106*b* of one of its connector ports 102*b*. After processing by switch fabric card 10, the data packets are forwarded via the transmit interface 104*b* through the removable optical backplane connector 130 one the appropriate one of the optical connector cards 120*a* which receives the processed packets through receive interface 106*a*. The optical connector card 120 provides the data packets to the appropriate line card 80.

Having shown the preferred embodiments, one skilled in the art will realize that many variations are possible within the scope and spirit of the claimed invention. It is therefore the intention to limit the invention only by the scope of the claims.

What is claimed is:

1. A reconfigurable data communications system comprising:
    a removable optical backplane connector having a first end and a second end;
    a first data communications card having an optical port adapted to receive said first end of said removable optical backplane connector; and
    a switch fabric card having a plurality of optical ports adapted to receive said second end of said removable optical backplane connector.

2. The reconfigurable data communications system of claim 1 wherein said first data communications card further comprises a plurality of input ports adapted to receive input signals, said first data communications card providing said input signals at said optical port.

3. The reconfigurable data communications system of claim 1 wherein said first data communications card is a service card.

4. The reconfigurable data communications system of claim 2 wherein said input signals are electrical signals.

5. The reconfigurable data communications system of claim 2 wherein said input signals are optical signals.

6. The reconfigurable data communications system of claim 1 wherein said removable optical backplane connector is an optical fiber.

7. The reconfigurable data communications system of claim 1 wherein the removable optical backplane connector further comprises a transmit optical fiber and a receive optical fiber.

8. The reconfigurable data communications system of claim 1 wherein said optical port of said first data communications card comprises at least one optical transceiver.

9. The reconfigurable data communications system of claim 1 wherein and said plurality of said optical ports of said switch fabric card are optical transceivers.

10. The reconfigurable data communications system of claim 1 wherein said first data communications card is disposed within a first chassis and said switch fabric card is disposed within a second chassis.

11. The reconfigurable data communications system of claim 1 wherein said first data communications card and said switch fabric card are disposed within a single chassis.

12. The reconfigurable data communications system of claim 1 wherein said first data communications card comprises a removable optical transceiver card.

13. The reconfigurable data communications system of claim 12 wherein said first data communications card further comprises a line card in electrical communication with said removable optical transceiver card.

14. A reconfigurable data communications system comprising:
    a removable optical backplane connector having a first end and a second end;
    a removable optical transceiver card having a first optical port adapted to receive said first end of said removable optical backplane connector;
    a data communications card in electrical communication with said removable optical transceiver card; and
    a switch fabric card having a plurality of optical ports adapted to receive said second end of said removable optical backplane connector.

15. The reconfigurable data communications system of claim 14 wherein said data communications card and said removable optical transceiver card are disposed within a first chassis and said switch fabric card is disposed within a second chassis.

16. The reconfigurable data communications system of claim 14 wherein said data communications card, said removable optical transceiver card, and said switch fabric card are disposed within a chassis.

17. A reconfigurable data communications system comprising:
    a plurality of removable optical backplane connectors, each of said plurality of said removable optical backplane connectors having a first end and a second end;
    a first data communications card having an optical port adapted to receive said first end of a first one of said plurality of said removable optical backplane connectors;
    a second data communications card having an optical port adapted to receive said first end of a second one of said plurality of removable optical backplane connectors; and
    a switch fabric card having a plurality of optical ports wherein a first one of said plurality of optical ports receives said second end of said first one of said plurality of said removable optical backplane connectors, and a second one of said plurality of optical ports receives said second end of said second one of said plurality of said removable optical backplane connectors.

18. A reconfigurable data communications system comprising:
    a plurality of removable optical backplane connectors, each of said plurality of said removable optical backplane connectors having a first end and a second end;
    a first data communications card comprising a line card and a removable optical transceiver card, said line card in electrical communication with said removable optical transceiver card, said removable optical transceiver card having an optical port adapted to receive said first end of a first one of said plurality of said removable optical backplane connectors;

a second data communications card comprising a line card and a removable optical transceiver card, said line card in electrical communication with said removable optical transceiver card, said removable optical transceiver card having an optical port adapted to receive said first end of a second one of said plurality of removable optical backplane connectors; and a switch fabric card having a plurality of optical ports wherein a first one of said plurality of optical ports receives said second end of said first one of said plurality of said removable optical backplane connectors, and a second one of said plurality of optical ports receives said second end of said second one of said plurality of said removable optical backplane connectors.

19. The reconfigurable data communications system of claim 18 wherein said first data communications card, said second data communications card and said switch fabric card are disposed within a chassis.

* * * * *